United States Patent
Carberry

(10) Patent No.: US 6,638,491 B2
(45) Date of Patent: Oct. 28, 2003

(54) METHOD OF PRODUCING SILICON METAL PARTICULATES OF REDUCED AVERAGE PARTICLE SIZE

(75) Inventor: John Carberry, Talbott, TN (US)

(73) Assignee: Neptec Optical Solutions, Inc., Jefferson City, TN (US)

( * ) Notice: Subject to any disclaimer, the term of this patent is extended or adjusted under 35 U.S.C. 154(b) by 0 days.

(21) Appl. No.: 09/960,010

(22) Filed: Sep. 21, 2001

(65) Prior Publication Data

US 2003/0059361 A1 Mar. 27, 2003

(51) Int. Cl.[7] ............................................... C01B 33/02
(52) U.S. Cl. ....................................................... 423/348
(58) Field of Search ................................. 423/348, 349, 423/350

(56) References Cited

U.S. PATENT DOCUMENTS

| 4,138,509 A | 2/1979 | Ingle et al. | |
| 4,269,620 A | 5/1981 | Johansson | 75/11 |
| 4,539,194 A | 9/1985 | Halvorsen | |
| 4,932,166 A | 6/1990 | Boecker et al. | 51/293 |
| 5,128,116 A | 7/1992 | Forwald et al. | |
| 5,668,068 A * | 9/1997 | Prochazka | 501/88 |
| 5,873,993 A | 2/1999 | Stubergh | |
| 5,919,430 A | 7/1999 | Hasenzahl et al. | |

* cited by examiner

Primary Examiner—Stanley S. Silverman
Assistant Examiner—Maribel Medina
(74) Attorney, Agent, or Firm—Pitts & Brittian, PC

(57) ABSTRACT

A method and apparatus of reducing the average particle size of silicon metal particulates employing a liquid oxidant extractant admixed with the silicon metal particulates while the silicon metal particulates are subjected to attrition in an attrition mill. An essentially oxidant-free silicon metal particulate product is produced, with the particulate product having an average particle size within that range of average particle sizes where the silicon metal particulates are susceptible to violent exothermic reaction with an oxidant.

20 Claims, 2 Drawing Sheets

METHOD OF PRODUCING SILICON METAL PARTICULATES OF REDUCED AVERAGE PARTICLE SIZE

CROSS-REFERENCE TO RELATED APPLICATIONS

Not Applicable.

STATEMENT REGARDING FEDERALLY SPONSORED RESEARCH OR DEVELOPMENT

Not Applicable

BACKGROUND OF INVENTION

This invention relates to methods and apparatus for reducing the particle size of metallic silicon to particles of a size which are subject to violent exothermic reaction with an oxidant such as oxygen, water, compounds having hydroxyl groups, or other oxidative groups.

Silicon metal is of important value in certain chemical applications as a feedstock and/or feedstock precursor in products such as glass, silicone, silanes and many other materials. In virtually all cases, the state of the silicon to be introduced includes small particle sizes, in the range of microns, narrow particle size distribution, and a surface substantially or completely free of oxygen, water, compounds having hydroxyl groups, or other oxidative groups. Providing small particle sizes of metallic silicon particulates with surfaces substantially or completely free of oxidative groups is important for improving the efficiency, yield, and quality, while reducing the costs of producing high quality optical glasses, silicon based computer chips, and other products utilizing silicon based materials.

Heretofore, the reduction of the particle size of silicon metal particulates, such as lump silicon metal, has been carried out in ball mills and the like. Ball milling involves several drawbacks. For example, the rate of milling and size of the milled product in a ball mill are a function of the diameter and speed of rotation and media (ball) size. Large media gives high rate of milling, but wide particle size distribution. Smaller media give a narrower particle size distribution but the particles are not as small. Ball milling creates heat, and as the surface area of the powder increases, it is susceptible, in the presence of water or oxygen, to undergoing a violent exothermic reaction. In ball mills, it is very difficult to keep the surface of the silicon free of oxygen or water. Further, most milling efficiency is lost if one adds a liquid to the mill. The increased potential for violent exothermic reactions between fine particle size silicon metal powder, particularly hot silicon metal powder, and oxidants, particularly oxygen, water, hydroxols, etc., has heretofore dictated the necessity for extreme precautionary measures when carrying out such a particle reduction process. These measures have included such extreme measures as the use of buildings designed to manage explosions.

Attrition mills for use in particle size reduction of silicon metal are known in the art. However, attrition mills generate even more heat than ball mills, therefore providing an explosive environment when milling of lump metallic silicon into a range of average particle sizes of silicon metal particulates that are susceptible to violent exothermic reaction with an oxidant, such as average particle sizes of 10 microns or smaller.

It is therefore an object of the present invention to provide a method for reduction of relatively large silicon metal particulates, such as lump silicon metal, to fine particle size particulates.

It is a further object of the present invention to provide an apparatus for use in the reduction of relatively large silicon metal particulates to fine particle size particulates.

It is a further object of the present invention to minimize the dangers inherent in the course of reducing relatively large silicon metal particulates to fine particle size particulates.

It is a further object of the present invention to produce fine particle size silicon metal particulates having surfaces that are substantially or completely free of oxidative groups.

SUMMARY OF INVENTION

In accordance with the present invention there is provided a method for reducing the average particle size of relatively large silicon metal particulates, such as lump metal silicon, to relatively fine particle size silicon metal particulates having a narrow range of size distribution while eliminating or minimizing the problems associated with the prior art methods and apparatus, particularly those problems or potential problems associated with the potential for violent reactivity of the silicon metal particulates with an oxidant. An oxidant-free silicon metal particulate product is produced by the method.

DETAILED DESCRIPTION OF INVENTION

Figure 1:
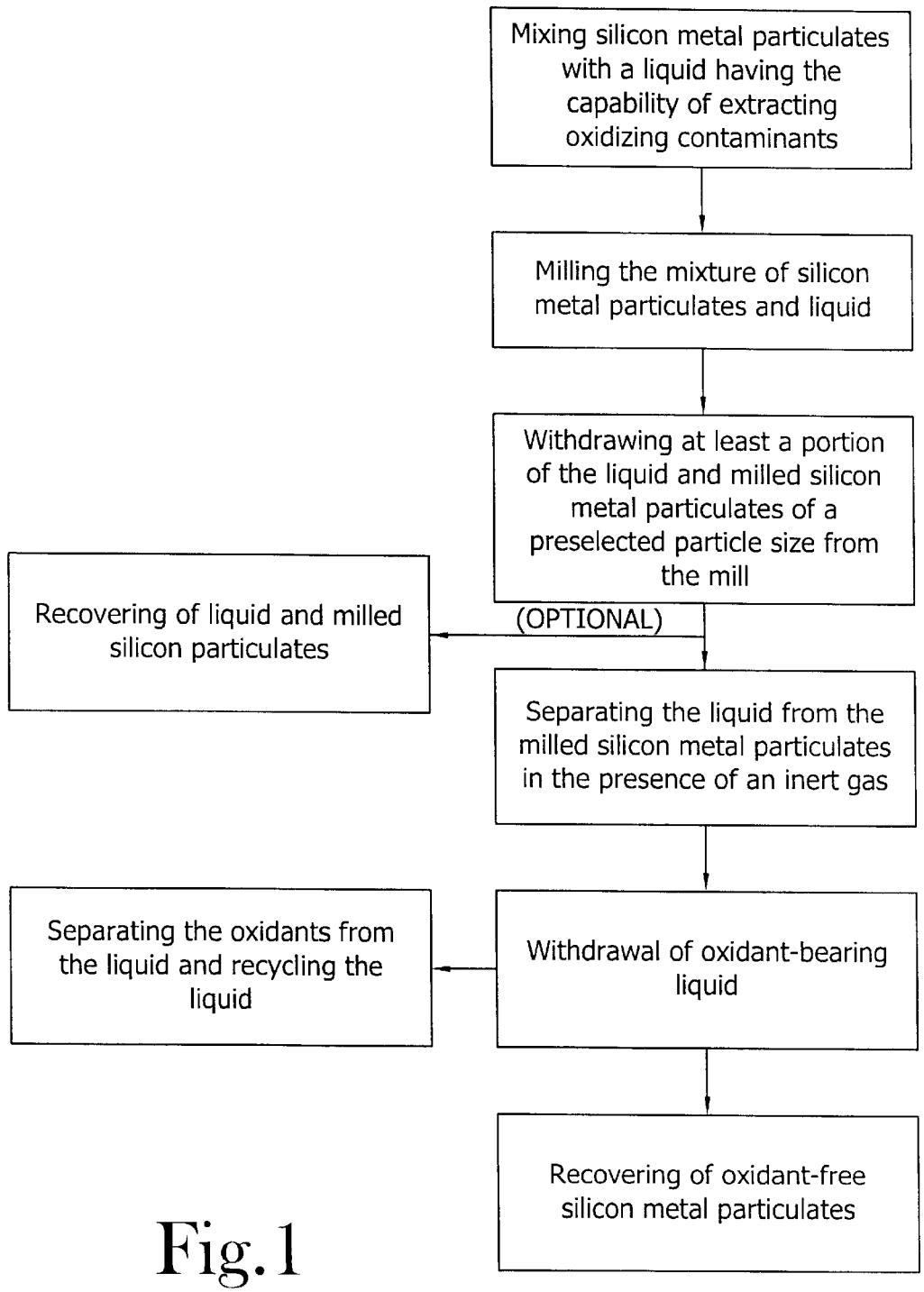
FIG. 1 is a schematic representation of one embodiment of a method embodying various features of the present invention; and, FIG. 2 is a schematic representation of one embodiment of an apparatus for carrying out the method of the present invention.
Figure 2:
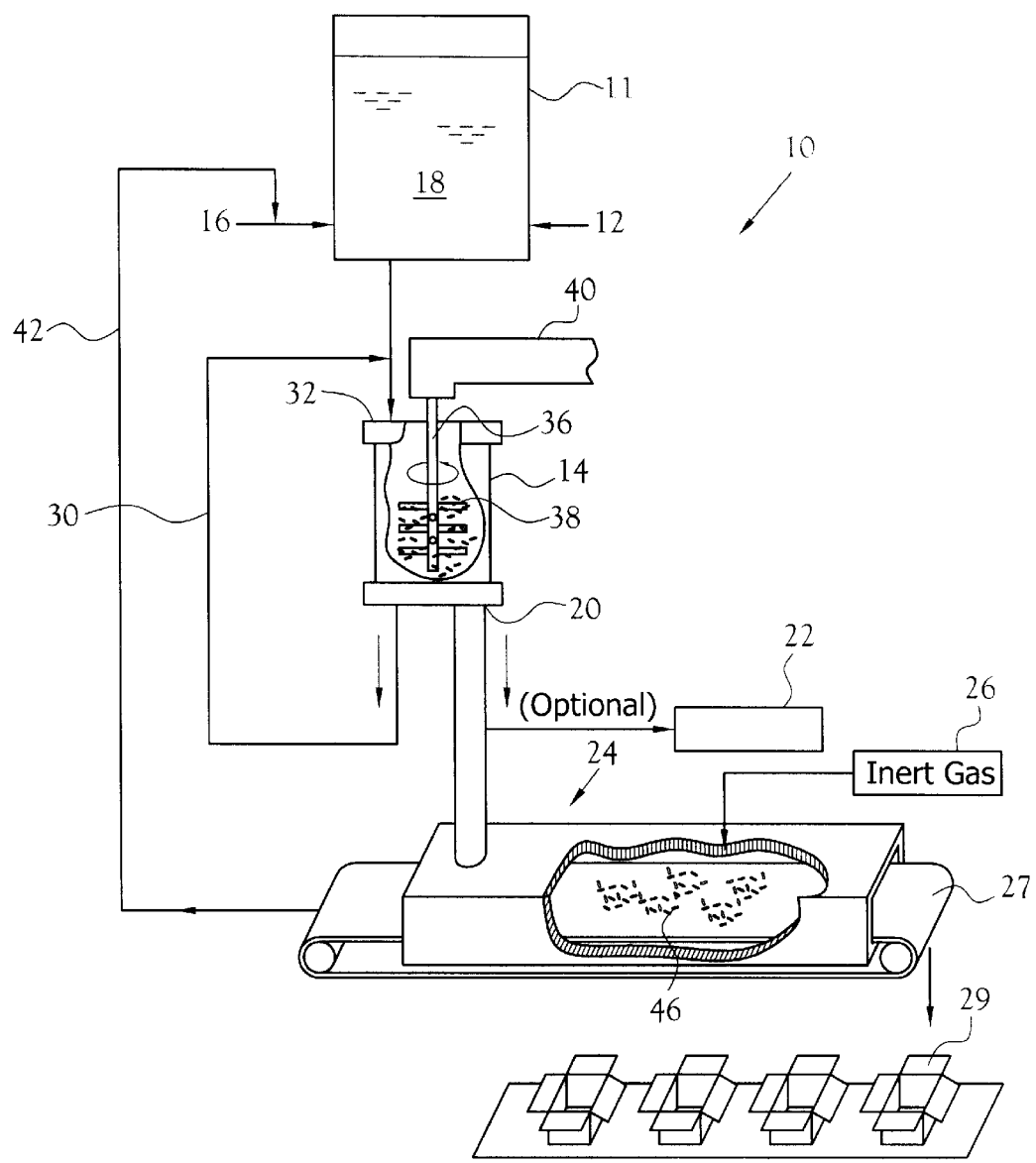

FIG. 1 depicts a flow diagram, and FIG. 2 depicts an apparatus 10 suitable for carrying out one embodiment of the present method, including the steps of admixing silicon metal particulates 16 of a relatively large size, such as lump silicon metal, in a vessel 11 with a liquid 12 which is essentially inert with respect to silicon metal and which is suitable for the extraction of oxidants such as water, oxygen, hydroxyls and the like from silicon metal particulates to form a mixture 18 of the liquid and particulates, admitting the mixture 18 to an attrition mill 14 for a time sufficient to reduce at least a portion of the particulates to a preselected average particle size which is smaller than the initial average particle size of the silicon metal particulates, withdrawing from the bottom end 20 of the attrition mill 14 a portion of the mixture 18 of the liquid and reduced-size particulates. The withdrawn portion of the mixture 18 of liquid and reduced-size particulates, without further treatment, may be useful in certain chemical applications and may be collected in a container 22.

Commonly, however, the present method will include the further step of introducing the withdrawn portion of the reduced particulates and liquid to a drying station 24 wherein the withdrawn portion of the liquid and reduced-size particulates is held under an inert gas 26 cover and cooled to a temperature wherein the silicon metal exhibits at least a reduced reactivity with oxidants, and thereafter recovering the cooled reduced-size particulates under conditions which exclude the presence of water, oxygen, compounds having hydroxyl groups, and other oxidative compounds, thereby enhancing the usefulness of the reduced-size particulates as a feedstock for various chemical applications. The withdrawn liquid and particulate mixture may be received within the drying station on a conveyor belt 27 and ultimately transferred to one or more containers 29 by any of the techniques well known in the art for handling silicon metal powder of an average particle size which is susceptible to violent reaction with an oxidant.

In one embodiment, the method of the present invention is carried out on a continuous basis, thereby providing desirable cost savings over prior art ball mill processes.

As further depicted in FIG. 2, optionally a portion of the mixture contained in the attrition mill may be withdrawn from adjacent the bottom end 20 of the mill and recycled by a conduit 30 to the top end 32 of the mill.

The silicon metal particulates initial feedstock may have an average particle size of about 100 microns, such as lump silicon metal and/or metal particulates. Silicon metal particulates of substantially any initial average particle size may be employed if proper safety precautions are employed, but the present invention contemplates that the first quantity of average particle size of the silicon metal particulates feedstock will be in that range of average particle sizes where the silicon metal is essentially non-violently reactive with ambient oxidants such as moisture, oxygen in air, or the like.

In the present method, the initial feedstock of silicon metal particulates is admixed with a liquid 12 which is suitable for the extraction of oxidants such as water, oxygen, hydroxyl radicals, and the like, from the silicon metal particulates. In one embodiment of the present invention, the liquid oxidant extractant employed suitably may be ethanol. Other liquids or combinations of liquids which are essentially inert to silicon and which are capable of extracting oxidants from silicon particulates may be employed. Preferably the liquid oxidant extractant is readily distilled for purposes of separating oxidants from the liquid so that the liquid oxidant extractant may be recycled. Examples of such other liquids may include any dry alcohol.

The quantity of liquid initially admixed with the silicon particulates is not particularly critical so long as the quantity of liquid added is sufficient to fully wet the silicon particulates and have the capacity to attract and extract oxidants from the surfaces of silicon particulates. One suitable ratio of silicon metal particulates to the liquid is 1:1. The admixing function need only be carried out for a time sufficient to ensure good distribution of the silicon particulates in the liquid. Normally, stirring of this mixture 18 is not required, but may be employed as needed.

The mixture 18 so formed is introduced into the attrition mill 14 wherein the size of each of the first quantity of silicon metal particulates being greater than about 100 microns, is reduced toward a preselected relatively smaller average particle size, producing a second quantity having an average particle size of about 12 microns or smaller. The transfer of the mixture 18 of silicon metal particulates and liquid from vessel 11 to the attrition mill 14 preferably is direct and in the absence of oxidants from an external source. The retention time of the mixture 18 within the attrition mill 14 is dependent upon several factors, such as the initial average particle size of the silicon metal particulates, the speed of operation of the attrition mill 14 the preselected final average particle size of the silicon metal particulates, etc. Addition of ceramic pellets (zirconia pellets, for example) to the attrition mill 14 has been found useful in accelerating the milling of the silicon metal particulates. In one embodiment of the present method, the attrition mill 14 is of the vertical type as described further hereinbelow.

The second quantity of reduced sized particulates 46, along with a portion of the liquid oxidant extractant, are withdrawn from the bottom end 20 of the attrition mill. Optionally, the withdrawn portion of liquid and reduced sized particulates 46 may be recovered for use in certain chemical applications wherein the presence of the liquid is non-detrimental or possibly of value. Commonly, however the withdrawn portion of liquid and reduced sized particulates 46 is conveyed to a drying station 24 wherein the particulates are cooled and the liquid oxidant extractant is extracted from the mixture, all under a cover of inert gas 26, such as argon. The cooled and dried and essentially oxidant-free reduced-size particulates 46 are recovered for use in a subsequent chemical application. This withdrawal and transfer of the desired final average particle size silicon metal particulates 46, along with a portion of the liquid from the attrition mill 14 to the drying station may be direct and in the absence of oxidants from an external source.

Withdrawal of a portion of the liquid and reduced-size silicon metal particulates 46 from the mill may be through a screen located in the bottom end 20 of the mill. Such screen may be chosen to permit the passage therethrough of only those silicon metal particulates of a given or small particle size, thereby limiting the withdrawal to such sized particulates 46 (along with some liquid). Optionally, a portion of the mixture within the mill may be withdrawn and passed through an external screening operation wherein the desired particle size particulates 46 are extracted, along with liquid. In either event, those particulates which require further size reduction may be recycled by a conduit 30 to the top end 32 of the mill or, in some instances, merely held within the mill for further processing.

Within the drying station 24, while maintained under an atmosphere of inert gas 26, such as argon, the reduced-size particulates 46 are cooled and the liquid is extracted from the particulates. This extracted liquid contains both the original liquid and any water, oxygen, or other oxidants which have been extracted from the silicon metal particulates in the course of the admixing and milling functions. This extracted liquid, in one embodiment, may be advantageously treated, as by distillation techniques, to remove the captured oxidants from the original liquid, e.g. ethanol, which is desirable by reason of its ease of distillation, and the original liquid so recovered is recycled by a transfer 42 process known to those skilled in the art to the admixing function of the present method.

The extraction in the drying station 24 of the liquid from the mixture of the liquid and reduced size silicon metal particulates 46 serves to cool and dry the particulates 46, therefore separating from the particulates 46 the liquid and its captured oxidants and rendering the reduced size silicon metal particulates 46 free of oxidants.

The cooled, dried, and oxidant-free silicon metal particulates, still held under an atmosphere of inert gas, may be packaged into individual containers or bulk packages for subsequent use in various known chemical applications.

In the course of the milling operation of the present method, it has been found to be advantageous at times to withdraw a portion of the mixture of incompletely-size-reduced particulates from the bottom end 20 of the attrition mill 14 and return the same to the top end 32 of the mill for recycling thereof.

The attrition mill 14 employed in the present invention may be a conventional attrition mill, preferably of the vertical mill type, which includes a vertically oriented central stirrer 36 that includes a plurality of horizontal rods 38 projecting therefrom. A conventional drive 40, preferably speed-controlled, connected to the stirrer 36 provides power for rotation of the stirrer. Advantageously, this mill 14 is of the vertical type in which the mixture is introduced into the mill at the top end thereof and "works" its way downwardly through the mill by reason of the stirring of the mixture by a vertically oriented stirrer disposed generally centrally of the mill.

Vertical attrition mills, even though they generate more heat than ball mills, are attractive by reason of their lower capital and/or operating costs. They further are more amenable to control over the "work" imparted to the mixture within the mill, thereby providing a higher degree of control over the overall functioning of the mill.

In the present method, any excess hydrogen generated in the course of the milling operation will be drawn off by ethanol, and/or may be vented and flared. This process, if it occurs, is advantageous for the reason that any free oxygen or water within the mill will react with the hydrogen gas stream, thereby further serving to dry the environment within the mill.

Notably, the method of the present invention provides a safe method of reducing silicon metal particulates to an average particle size within that range of average particle sizes where the silicon metal particulates are susceptible to deleterious violent exothermic reaction with the more common sources of oxidants, such as water, oxygen (from air, for example), hydroxyl radicals, and the like. The method is suitable for continuous operation from a remote location of operational personnel, is less capital cost burdensome than ball mills, and is capable of higher throughput of process materials than ball mills. Moreover, the use of an attrition mill is compatible with the necessary presence of a liquid oxidant extractant, whereas the efficience of ball mills is unsatisfactorily reduced when a liquid is added to the ball mill.

Whereas the present method has been described in connection with the recovery of the silicon metal particulates dried of the liquid extractant employed in the attrition mill, it is to be recognized that a liquid extractant and silicon metal particulates mixture is useful in certain chemical applications. For such applications, the drying and liquid recovery functions described hereinabove are unnecessary.

Whereas the present invention has been described in specific details with respect to the illustrated embodiments, it will be recognized that alternative embodiments of the disclosed method and apparatus may be employed without departing from the scope of the present invention as set forth in the claims appended hereto.

What is claimed:

1. A method of reducing the average particle size of a first quantity of silicon metal particulates comprising the steps of:
    admixing the first quantity of silicon metal particulates with a liquid having the ability to extract one or more oxidants from the silicon metal particulates, said step of admixing maintained for a time sufficient for wetting the first quantity of silicon metal particulates in the liquid prior to attrition to develop an oxidant free mixture of particulates and liquid,
    introducing said oxidant free mixture of particulates and liquid into an attrition mill, said step of introducing proceeding in the absence of oxidants,
    subjecting said silicon metal particulates of said mixture to attrition in the attrition mill for a time sufficient to reduce at least a portion of said silicon metal particulates to a preselected average particle size and for said liquid to extract one or more oxidants from said silicon metal particulates to produce a second quantity of reduced particle size silicon metal particulates being essentially oxidant free, and
    withdrawing from said attrition mill at least a portion of said second quantity of reduced particle size silicon metal particulates, along with a portion of said liquid.

2. The method of claim 1 and including the step of introducing said withdrawn portion of said reduced particle size silicon metal particulates and liquid into a drying vessel which is maintained under an atmosphere of inert gas.

3. The method of claim 2 and including the step of, while said withdrawn portion of reduced particle size silicon metal particulates and liquid are in said drying vessel, withdrawing said liquid containing said extracted one or more oxidants from said silicon metal particulates, thereby providing reduced particle size silicon metal particulates of the preselected average particle size which are essentially free of deleterious oxidants and essentially free of said liquid extractant.

4. The method of claim 1 and including the step of recovering said withdrawn portion of reduced particle size silicon metal particulates and liquid extractant for use in a subsequent chemical application.

5. The method of claim 3 and including the step of packaging said oxidant-free silicon metal particulates for subsequent use in a chemical application.

6. The method of claim 1 wherein said silicon metal particulates initially admixed with said liquid comprise lump silicon metal particulates.

7. The method of claim 6 wherein the silicon metal particulates of the first quantity comprise silicon metal particulates of an average particle size greater than about 100 microns.

8. The method of claim 1 wherein said preselected average particle size of the reduced particle size silicon metal particulates is about 12 microns or less.

9. A method of producing silicon metal particulates having an average particle size within that range of average particle sizes of silicon metal particulates wherein the silicon metal particulates are susceptible to violent exothermic reaction with an oxidant, said silicon metal particulates being essentially free of oxidants, the method comprising the steps of:
    wetting a first quantity of silicon metal particulates by mixing with a liquid having the capacity to attract and extract oxidants from the surfaces of silicon metal particulates, whereby said step of wetting providing an oxidant free mixture of said first Quantity of silicon metal particulates and liquid,
    treating said oxidant free mixture of said first quantity of silicon metal particulates and liquid, said silicon metal particulates of an average particle size outside that range of average particle sizes of silicon metal particulates wherein the silicon metal particulates are susceptible to violent exothermic reaction with an oxidant, in an attrition mill in the presence of a liquid oxidant extractant for a time sufficient to provide at least a second quantity of silicon metal particulates being essentially free of oxidants wherein the second quantity of silicon metal particulates having an average particle size within that range of average particle sizes of silicon metal particulates wherein the silicon metal particulates are susceptible to violent exothermic reaction with an oxidant.

10. The method of claim 9 and including the step of withdrawing said at least a second quantity of silicon metal particulates and a portion of said liquid oxidant extractant from said attrition mill for use in a subsequent chemical application.

11. The method of claim 10 and including the further step of separating said liquid oxidant extractant from said withdrawn silicon metal particulates and said portion of liquid under oxidant-free ambient conditions.

12. The method of claim 11 and including the step of recovering said withdrawn silicon metal particulates for use in a subsequent chemical application.

13. The method of claim 11 and including the step of removing oxidants from said liquid oxidant extractant and recycling said liquid oxidant extractant for use in further silicon metal particulate attrition.

14. The method of claim 11 wherein said liquid oxidant extractant is readily distilled.

15. The method of claim 11 wherein said liquid oxidant extractant is ethanol.

16. The method of claim 11 wherein said liquid oxidant extractant is selected from the group consisting of ethanol, and other dry alcohol.

17. The oxidant-free silicon metal particulate product obtained by the method of claim 9.

18. A silicon metal particulate product comprising silicon metal particulates having surfaces essentially oxidant-free, said silicon metal particulates of an average particle size which is susceptible to violent exothermic reaction with an oxidant wherein said silicon metal particulate product is essentially oxidant-free.

19. The silicon metal particulate product of claim 18 wherein said oxidant-free silicon metal particulate product is formed in an attrition mill in the presence of a liquid oxidant extractant for a time sufficient to provide at least a quantity of silicon metal particulates having an average particle size within a range of average particle sizes wherein said quantity of silicon metal particulates are susceptible to violent exothermic reaction with an oxidant and are maintained essentially oxidant-free when in the presence of said liquid oxidant extractant.

20. The silicon metal particulate product of claim 19 wherein said average particle size of said oxidant-free silicon metal articulate product is about 12 microns or less.

* * * * *